Dec. 6, 1966  R. P. TOLLAR  3,290,038

EXTENSIBLE SHOCK ABSORBER

Filed Jan. 14, 1965  4 Sheets-Sheet 1

INVENTOR.
RAYMOND P. TOLLAR.
BY
*Richard G. Geib*
ATTORNEY.

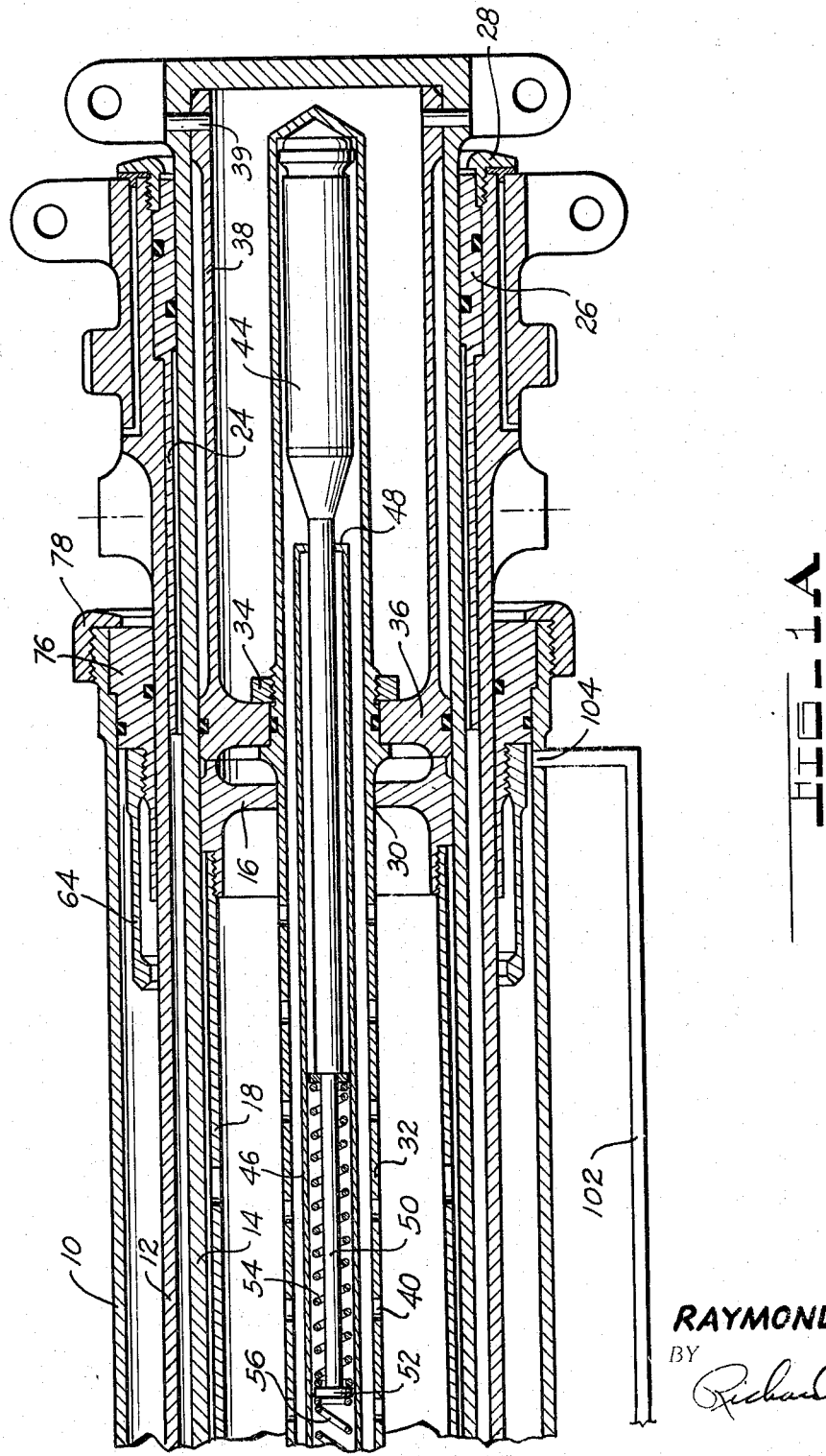

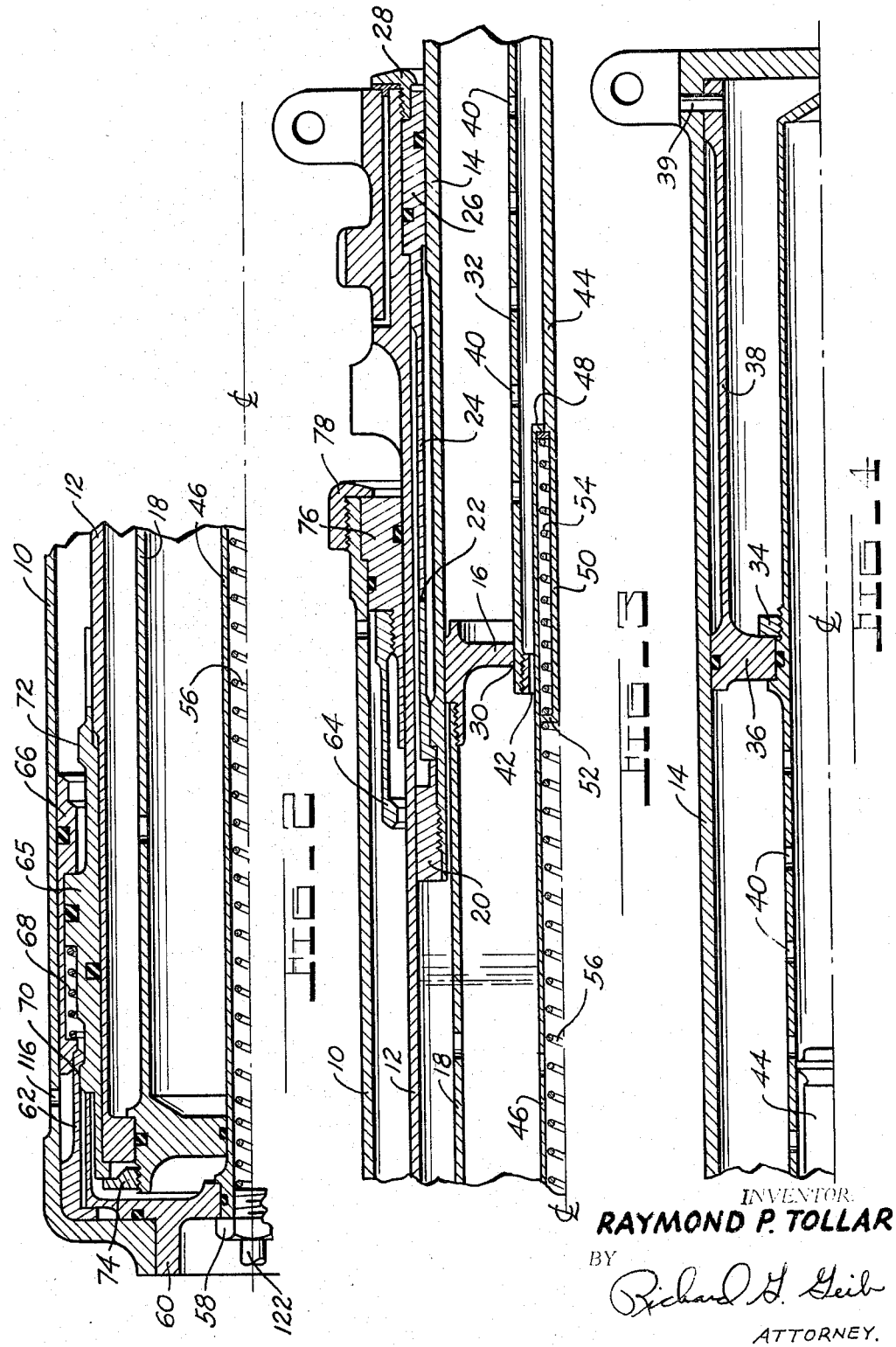

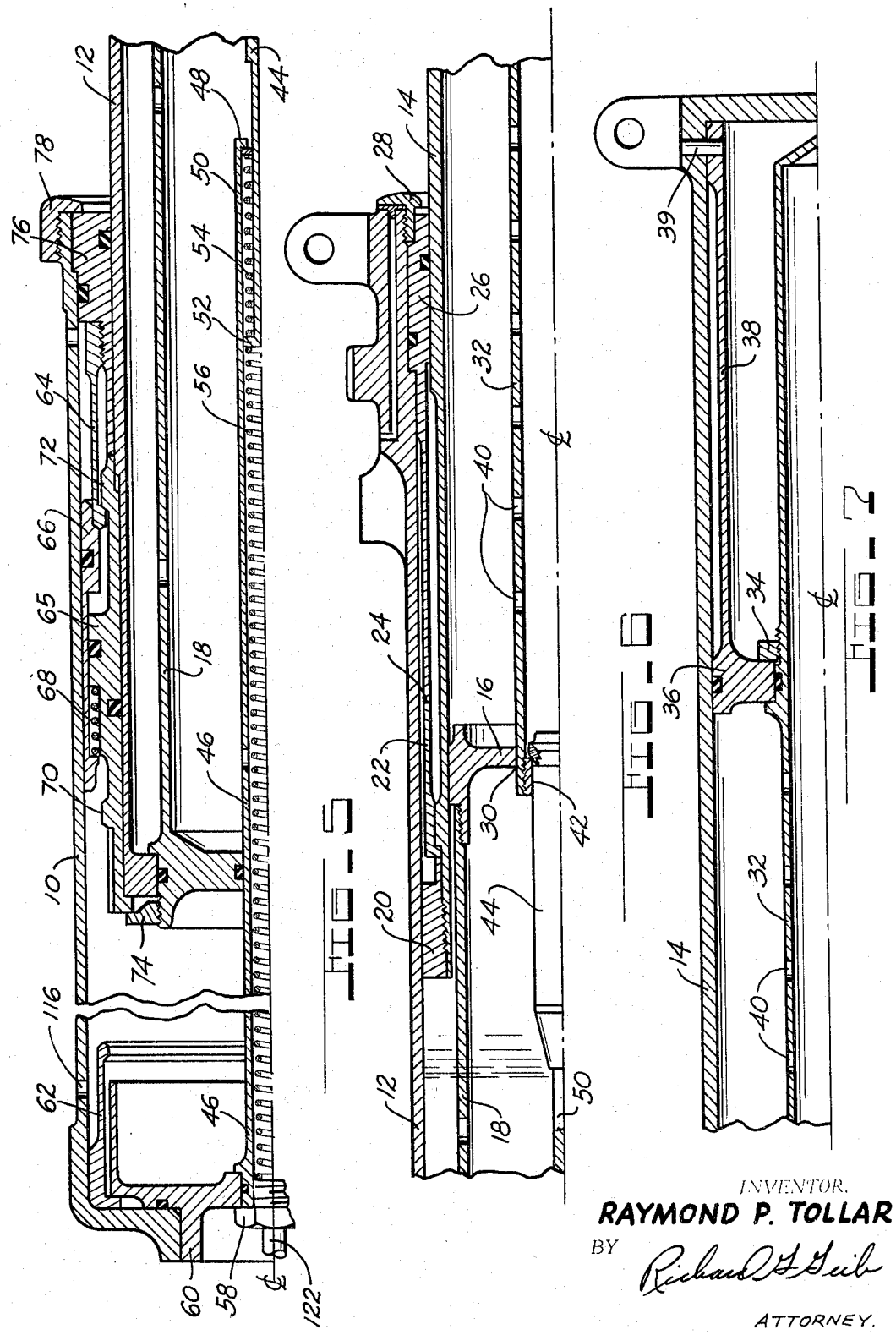

United States Patent Office 3,290,038
Patented Dec. 6, 1966

3,290,038
EXTENSIBLE SHOCK ABSORBER
Raymond P. Tollar, South Bend, Ind., assignor to The Bendix Corporation, South Bend, Ind., a corporation of Delaware
Filed Jan. 14, 1965, Ser. No. 425,437
5 Claims. (Cl. 267—64)

This invention relates to an extensible strut and more particularly to an extensible shock absorbing strut for use with an aircraft landing gear.

It may be desirable in certain instances to change an airplane's angle of attack for take-off from that presented when the aircraft is normally resting on its landing gear. This is particularly so when the aircraft is to be launched by a catapult or where runway length must be short. Furthermore, it is necessary that means be provided to maintain such an attitude throughout the catapult or take-off run of the aircraft.

It is of course necessary to have shock absorbing means associated with the landing gear for assuming the shock loads encountered during landing the aircraft. As it is not, however, necessary to have a complete shock absorbing system in the landing gear because the loads are different from those encountered during a landing operation, it is possible to utilize a shock absorber to accomplish the foregoing conditions of obtaining a desirable angle of attack and firmly holding, but not unyieldingly holding, the position during a catapult or take-off run of an aircraft.

It is therefore a principal object of my invention to provide a simple, inexpensive and practical shock absorber for an aircraft which may be extended and locked in an extended position without detracting from its shock absorbing qualities.

It is a further object of my invention to provide an extensible shock absorbing means which may be remotely controlled.

Another object of my invention is to provide an extensible shock absorber means which is far more positively controllable than prior attempts at solving the problems to which my invention is related.

Other objects and advantages of my invention will become apparent from the following description of the accompanying drawings in which:

FIGURE 1A is a cross-sectional view of an upper half of the shock absorber constructed in accordance with the principles of my invention and shown in the completely compressed attitude with a schematic fluid control system connected therewith;

FIGURE 2 is a partial cross-sectional half view of one end of my shock absorber showing the arrangement of parts therein when the shock absorber is in a normally extended attitude;

FIGURE 3 is a partially cross-sectional half view of an intermediate portion of my shock absorber showing the arrangements of certain of the details thereof during the normal extended attitude of the shock absorber;

FIGURE 4 is a partially cross-sectional half view of an end of my shock absorber showing the details thereof and their location when my shock absorber is in a normally extended attitude;

FIGURE 5 is a partial cross-sectional half view of an end of my shock absorber showing the parts therein when in an attitude where the shock absorber has been extended;

FIGURE 6 is a partial cross-sectional half view of an intermediate section of my shock absorber showing the details therewithin when the shock absorber is extended; and FIGURE 7 is a partial cross-sectional half view of an end of my shock absorber showing the details therewithin when my shock absorber is extended.

Figure 1:
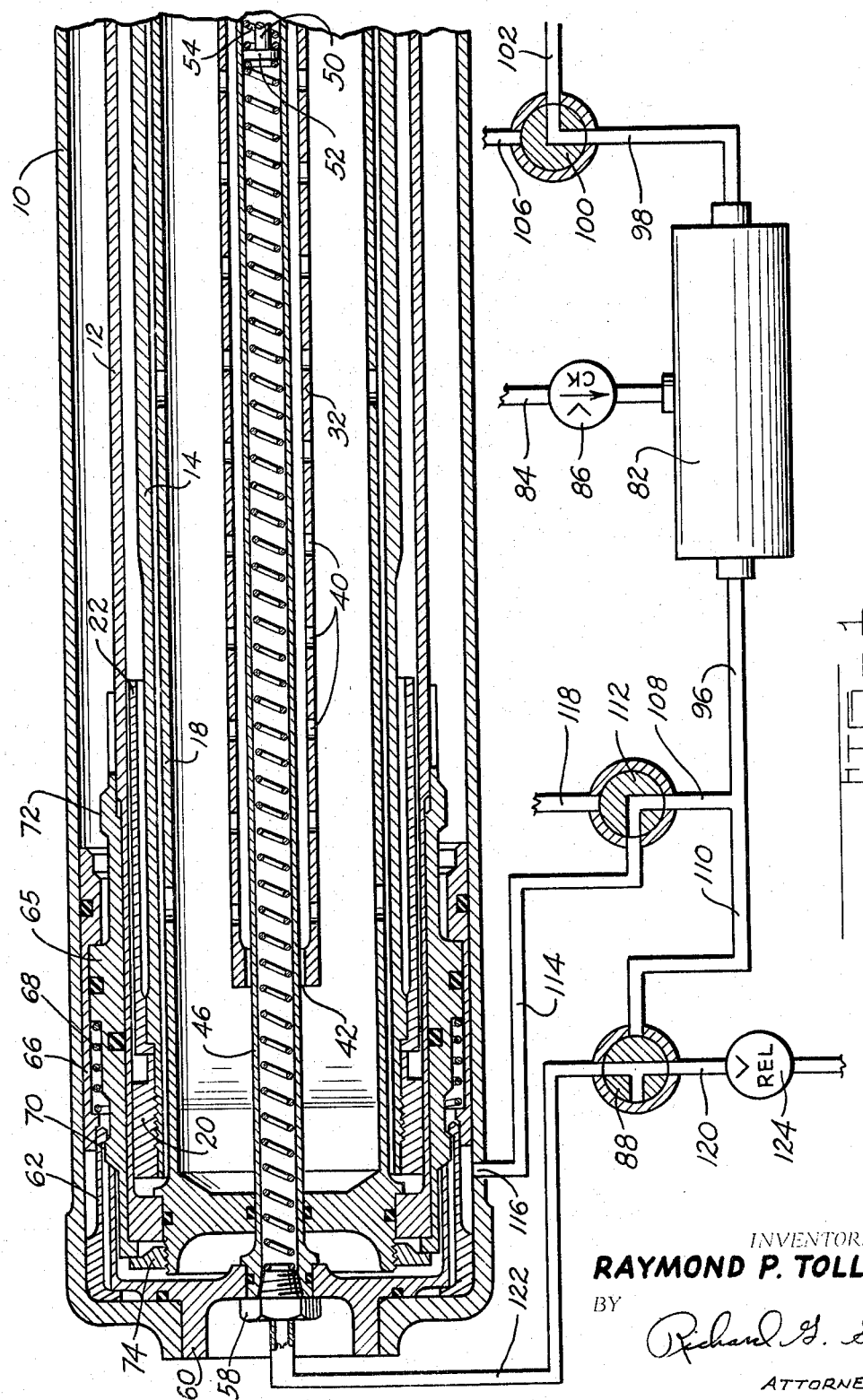
FIGURE 1 is a cross-sectional view of a lower half of a shock absorber constructed in accordance with the principles of my invention and shown in a completely compressed attitude with a schematic fluid control system connected therewith.

With particular reference to FIGURE 1 and FIGURE 1A I show a shock absorber having an outer barrel 10 and an intermediate barrel 12 within which a telescoping inner barrel 14 is reciprocably arranged. As seen, the inner barrel 14 is guided at the extreme right end by an annular bearing 26. An end closure 16 is affixed to a tubular member 18, which end closure is peripherally machined to slidably support tubular member 18 within barrel 14. In addition, the barrel 14 is provided at its end within the tube 12 with an annular piston 20 whose peripheral surface is also machined to provide a bearing surface that is in contact with the inner surface of the inner barrel 12.

As seen, the piston 20 also includes a trailing collar 22 which will cooperate with a projecting collar 24 that is held to the extreme right end of the inner barrel 12 by means of a bearing 26 and a nut 28 to limit the distance that the tube 14 may project from the inner barrel 12. The collars 22 and 24 serve as centering cams when the strut is extended by having contoured abutting surfaces.

As seen, the end closure 16 is also provided with a centrally located opening 30 which is sized to permit the travel therethrough of a metering means 32 which is attached, as by a nut 34 to a bulkhead 36 which is positioned and held within the tube 14 by means of an integral skirt 38 pinned, as at 39, to inner barrel 14.

As seen, the metering means 32 is formed from a tubular member having a plurality of radial orifices 40 and an opening 42 in its leftwardmost extremity. Prior to assembling the inner tube 14 within the barrel 12, an orifice valve 44 including a tubular support 46 therefor is inserted within the metering means 32. The tube 46 is provided with an annular bulkhead 48 through which a small diameter rod extension 50 of the orifice valve 44 extends, which rod extension is provided at its leftmost extremity with a disc 52 sized to slidably fit the internal dimension of tube 46. Between the disc 52 and the bulkhead 48 I have employed a spring 54 to hold the orifice valve 44 against the bulkhead 48. If desired, although not necessarily required, an additional spring 56 may be employed between the disc 52 and the end of the tube 46 against a fitting 58, which upon assembly is threaded to the tube 46 to hold the tube to an end closure 60 for the outer barrel 10.

The outer barrel 10 is provided with a pair of annular finger locks 62 and 64, one at each end of barrel 10, and the inner barrel 12 is provided with an annular ring structure 65 over which is fitted a locking sleeve 66, which locking sleeve is positioned on the structure 65 by means of a spring 68. The ring structure and locking sleeve fill the space between the inner and outer barrels and provide reciprocatory contact therebetween. As seen in FIGURE 1, the locking sleeve 66 is held by spring 68 against the right end of the locking finger 62 to hold the locking finger over a radial flange 70 of the ring structure 65. In addition, another radial flange 72 is provided at the opposite end of the ring structure 65 which will cooperate in a similar manner with the locking fingers 64 whenever the inner barrel 12 is caused to extend to the right from the outer barrel 10.

As seen, the ring structure 65, as well as tube 18, is held to the inner barrel 12 by means of a nut 74 clamping the ring structure 65 and the tube 18 to an annular, inwardly directed, flange of the barrel 12. As for the locking fingers 62 and 64, they are positioned within the outer barrel 10 by means of the end closure 60 at the left end, as seen in FIGURE 1, and by means of an annular bearing 76 held to the outer barrel 10 by means of a nut 78.

In normal usage the extreme left end of a shock absorber, as aforedescribed, is held to a structure, such as a wing or fuselage, of an aircraft; whereas the extreme right end is operatively connected to a wheel assembly. As this type of connection is considered to be familiar to those skilled in the art to which this invention relates, it will not be shown in detail herein.

Referring still to FIGURE 1, I show a pneumatic pressure container 82 receiving air pressure from a source such as a compressor air bleed for a turbojet engine of an aircraft (not shown), as by means of a conduit 84 and check valve 86. The pneumatic pressure container is connected by a conduit 96 extending from the left end thereof and a conduit 98 extending from the right end thereof to a pneumatic pressure supply system. The conduit 98 is directed to a simple two-way valve 100 which is connected by means of a conduit 102 to a port 104 in the outer barrel 10 or by means of a conduit 106 to atmosphere. The conduit 96 is provided with two branches 108 and 110, the latter of which is directed to a manifold valve 88, and the former of which is directed to a two-way valve 112 which can connect branch 108 either to a conduit 114 leading to a port 116 in the outer barrel 10 opposite the end containing port 104, or to a conduit 118 connected with atmosphere.

In order to extend the shock absorber, manifold valve 88 is operated to connect conduits 110 and 122 and the two-way valve 112 is operated to connect conduits 108 and 114 to first release the lock sleeve 66 and allow the ring structure 65 to free itself from the finger 62 and move to the right, as viewed in FIGURE 1, to the position shown in FIGURE 5 where the fingers 64 are engaged to hold the extended position of the inner barrel 12 with respect to the outer barrel 10. It should be noted that air pressure above the piston 20 and end closure 16 must be adequate to support any static load sustained for any length of time greater than nine or ten seconds; whereas the air pressure at port 116 is required only to hold lock sleeve in the locked position.

When it is desired to shrink the shock absorber to the normal extended position so that it may be stowed or operated normally, valve 112 is operated to connect port 116 with atmosphere through conduit 118, and valve 100 is operated to communicate conduits 98 and 102 as seen in FIGURE 1, whereby high pressure air will cause lock sleeve 66 to bottom on the ring structure 65 allowing radial expansion of fingers 64 to release the inner barrel and cause it to move to the extreme left position, as seen in FIGURE 1, where it again will be locked by fingers 62. After the inner barrel 12 is locked to the outer barrel 10, as seen in FIGURE 1, both valves 100 and 112 are then operated to communicate atmosphere to ports 104 and 116, respectively. The shock absorber is now ready for normal operation. During the shrinking, the conduit 122 is open to a pressure relief valve 124 that is connected to the manifold valve 88 by conduit 120. The pressure relief valve is designed to maintain a preselected air pressure in the shock absorber to permit normal operation thereof. If it is desired to eliminate this valve, one could completely exhaust the shock absorber to atmosphere through manifold valve 88 and thereafter operate the manifold valve to communicate conduits 110 and 122 to recharge the shock absorber until a preselected pressure is reached for normal operation of the shock absorber.

In the normal operating condition, the structural elements aforedescribed will be arranged as more particularly shown in FIGURES 2, 3 and 4 showing the left end, the intermediate portion and the right end of the shock absorber, respectively.

FIGURES 5, 6 and 7 correspond to FIGURES 2, 3 and 4. However, they show the arrangement of the structural elements when the shock absorber has been fully extended. In more detail, FIGURE 5 shows that the ring structure 65 has been moved by high pressure air entering port 116 and by the fact that port 104 is open to atmosphere so that locking sleeve 66 is holding finger 64 to the raised flange 72.

It should be noted that one other significant difference is in the elimination of significant travel or stroking of the shock absorber during the extended attitude. More particularly, in the extended attitude, the orifice valve 44 has been positioned to close off the opening 42 to thereby create a fluid block below the piston 20 and end closure 16. Thus, the liquid below the piston 20 and end closure 16 acts as a liquid spring having limited compressibility to support the high loads during short take-off operation. The orifice valve 44 is held closed by pressure in the chamber below the end closure 16 and piston 20 and the orifice valve will remain closed regardless of piston movement due to pressure of the liquid on the right end of valve 44.

It is therefore believed that the above description accomplishes the foregoing objects enumerated. In addition, it should be fully realized by those skilled in the art to which my invention relates that I have provided a means for raising the angle of attack of an aircraft for short field operation which has heretofore been accomplished by varying the angle of attack of the respective aerodynamic surfaces of an aircraft. Furthermore, while it has long been a desire to lock a nose landing gear shock absorber in a static position for catapulting of an aircraft, these other attempts have been, as I have stated, simply to hold a shock absorber in its static position. None of the prior art devices of which I am aware operate to extend a shock absorber and thereby position an aircraft in a proper angle of attack for short field operation.

Although preferred embodiments of this invention are illustrated, it will be realized that various modifications of the structural details may be made without departing from the mode of operation and the essence of the invention. Accordingly, the appended claims and not the aforesaid detailed description are determinative of the scope of this invention.

I claim:
1. A shock absorber comprising:
   an outer barrel;
   an intermediate barrel slidably supported in said outer barrel;
   an inner barrel slidably supported in said intermediate barrel;
   a means metering fluid transfer between said inner and said intermediate barrels;
   a means to extend said intermediate barrel from said outer barrel; and
   a means operable after extension of said intermediate barrel from said outer barrel to valve said means metering fluid transfer between said inner and said intermediate barrels creating a fluid block between said inner and said intermediate barrels to limit reciprocatory movement between said barrels.
2. A shock absorber according to claim 1 and having locking means including a pressure responsive releasing means for said locking means associated with said outer barrel to hold said intermediate barrel within said outer barrel in both the retracted and extended positions with respect to said outer barrel.
3. A shock absorber according to claim 1 and having:
   a first locking sleeve associated with one end of said outer barrel;
   a second locking sleeve associated with the other end of said outer barrel;
   a locking ring operatively connected to said intermediate barrel adjacent one end thereof within said outer barrel; and
   a pressure responsive lock holding means operatively connected to said locking ring and operative to prevent removal of said locking sleeve from said locking ring in one position and to permit release thereof in another position.

4. A shock absorber according to claim 1 wherein said means operable after extension of said intermediate barrel from said outer barrel to valve said means metering fluid transfer between said inner and said intermediate barrels includes an orifice valve responsive to the position of said means metering fluid transfer between said inner and said intermediate barrels to close off an orifice therebetween to bring about the fluid block limiting the stroke capabilities of said shock absorber.

5. A shock absorber comprising:
an outer barrel having a first port at one end thereof and a second port at the other end thereof;
an intermediate barrel slidably received in said outer barrel;
an inner barrel slidably received in said intermediate barrel and including,
a piston for creating a variable volume chamber within said intermediate barrel which piston is provided with a means to communicate fluid internally of said inner barrel,
a means operatively connected with said inner barrel to meter the means communicating the variable volume chamber of said intermediate barrel internally of said inner barrel as said inner barrel is reciprocated with respect to said intermediate barrel,
a fluid pressure system including a first valve and conduits connected to said first port of said outer barrel and a second valve and conduits connected to said second port of said outer barrel which valves are operative to selectively apply fluid pressure to each end of said outer barrel;
a first locking means associated with said outer barrel adjacent said first inlet port;
a second locking means associated with said outer barrel adjacent said second port;
a locking ring associated with said intermediate barrel adjacent an end thereof within said outer barrel and arranged to be operatively associated with one or the other of said first or second locking means of said outer barrel, said locking ring including a pressure responsive lock holding sleeve operative upon the introduction of a fluid pressure to said first inlet port and to said second inlet port to release said first locking means or said second locking means, respectively; and
a means operatively connected to said outer barrel and said inner barrel and responsive to the position of intermediate barrel to completely close the means communicating said variable volume chamber of said intermediate barrel internally of said inner barrel upon the extension of said intermediate barrel from said outer barrel when said inner barrel is fully extended from said intermediate barrel to create a fluid block in said shock absorber which would substantially eliminate stroking capabilities of said shock absorber during the extended attitude.

References Cited by the Examiner

UNITED STATES PATENTS 1,918,697  7/1933  Gruss _____ 244—104

FOREIGN PATENTS 594,541  11/1947  Great Britain.
709,340  5/1954  Great Britain.

ARTHUR L. LA POINT, *Primary Examiner.*

R. M. WOHLFARTH, *Assistant Examiner.*